United States Patent Office 3,658,776
Patented Apr. 25, 1972

3,658,776
PROCESS FOR PREPARING POLYMERS OF
CONJUGATED DIENES
Floyd E. Naylor, Bartlesville, Okla., assignor to
Phillips Petroleum Company
No Drawing. Filed Feb. 20, 1970, Ser. No. 13,192
Int. Cl. C08d 1/32, 1/36; C08f 1/28
U.S. Cl. 260—84.7                                           8 Claims

ABSTRACT OF THE DISCLOSURE

Conjugated dienes are polymerized with an organoalkali-metal polymerization initiator wherein the properties of the conjugated diene polymers are improved by the addition of an allyl amine thereto such as triallylamine, prior to deactivating the polymerization initiator.

---

This invention relates to a process for improving the properties of a conjugated diene polymer. This invention relates to a process for providing a conjugated diene polymer having a broadened molecular weight distribution and exhibiting reduced cold flow properties.

A process has now been discovered for improving the processing characteristics of conjugated diene homopolymers and copolymers, in either random or block form, without deleteriously affecting the physical properties of the polymers.

According to my discovery, conjugated dienes are polymerized with organoalkali-metal initiators wherein allyl compounds of nitrogen are admixed to the polymerization reaction mixture prior to deactivation of the polymerization initiator to provide a polymer with improved processing characteristics.

It is an object of this invention to provide a conjugated diene polymer exhibiting improved processing properties. It is a further object of this invention to provide a process for broadening the molecular weight distribution and reducing the cold flow of conjugated diene polymers.

Further objects and advantages of this invention will become apparent to those skilled in the art from the following description and discussion herein set forth.

In accordance with my invention, the allyl compound is admixed to the polymerization reaction mixture under conventional polymerization conditions at any time prior to deactivation of the organoalkali-metal initiator employed to initiate the polymerization of the monomers. The allyl compounds can thus be added to the polymerization reaction mixture at the commencement of the polymerization process, such as following the charge of monomer and initiator, or can be added during the polymerization reaction, or after the polymerization is essentially complete. In the latter instance, wherein essentially all of the monomer(s) have been converted to polymers a period of time generally from about 0.1 to 6 hours and preferably 0.5 to 2 hours is provided for the reaction of the allyl compound with the polymerized monomers prior to deactivation of the organoalkali-metal initiator. It is preferred to add the allyl compounds of this invention to the polymerization reaction mixture at the commencement of the polymerization.

The amount of allyl compound employed in this invention is in the range from about 0.1 to 5, preferably 0.25 to 1, millimoles of allyl compound per 100 grams of monomers employed in preparing conjugated diene homopolymers or copolymers.

The polymers produced according to this invention can be processed easily, have a reduced tendency to cold flow, have a broadened molecular weight distribution, and a good balance of physical properties. The polymers can be compounded and vulcanized with the usual reinforcing materials, vulcanization accelerators, plasticizers, and the like, to produce articles such as tires, belting, shoe soles, wire coatings, and the like.

Homopolymers and copolymers of conjugated dienes or copolymers of conjugated dienes with monovinyl-substituted aromatic compounds can be employed according to this invention.

Conjugated dienes suitable for use in this invention contain from about 4 to 12 carbon atoms per molecule. Exemplary conjugated diene monomers include 1,3-butadiene; isoprene; 2,3-dimethyl-1,3-butadiene; 1,3-pentadiene; 3-methyl-1,3-pentadiene; 1,3-heptadiene; 3-butyl-1,3-octadiene; 2-phenyl-1,3-butadiene; and the like. Mixtures of the above conjugated diene monomers can also be employed in this invention.

Monovinyl-substituted aromatic monomers suitable for use in this invention in copolymerizing with the above-stated conjugated dienes are those compounds containing from about 8 to 20 carbon atoms per molecule. Suitable monovinyl-substituted aromatic monomers include styrene; 1-vinylnaphthalene; 2-vinylnaphthalene; 3-methylstyrene; 3,5-diethylstyrene; 4-dodecylstyrene; 4-cyclohexylstyrene; 4-phenylstyrene; 4-dimethylaminostyrene; 4-methoxystyrene; 4-methoxy-1-vinylnaphthalene; and the like. Mixtures of the above monovinyl-substituted aromatic monomers can be employed. When monovinyl-substituted aromatic monomers are employed in preparing copolymers with conjugated dienes, the monovinyl-substituted aromatic compound is generally employed in the range to provide from about 2 to 60, preferably about 10 to 40, weight percent of the total monomers charged.

The polymerization and treating conditions employed according to this invention are those conventional polymerization conditions for polymerizing conjugated dienes. The polymerization reaction can be carried out under autogeneous pressures. It is usually desirable to operate at pressures sufficient to maintain the monomeric material essentially in the liquid phase. The pressures will thus depend upon the particular materials being polymerized, the solvent being employed, and the temperature at which the polymerization is carried out. However, higher pressures can be employed, if desired, these pressures being obtained by some such suitable method as the pressurization of the reactor with a gas which is inert with respect to the polymerization reaction.

The polymerization can be carried out generally at a temperature within a range of about −30 to 150° C., preferaby from about 50 to 100° C. The time that is employed will likewise depend upon several factors such as choice of monomers, initiators, temperatures, allyl compounds, and the like. Generally from about 0.01 to 100 hours, preferably from about 1 to 20 hours, are employed for the polymerization and the preparation of the improved polymer according to this invention.

The polymerization can be carried out in the presence or absence of a solvent mixture. The polymerization is preferably carried out in the presence of a solvent mixture comprising a hydrocarbon selected from aromatic hydrocarbons, paraffins, cycloparaffins, and the like. The hydrocarbon diluent employed can vary widely, but preferably contains from about 3 to 12 carbon atoms per molecule. Mixtures of two or more hydrocarbon diluents can be employed. Examples of suitable hydrocarbons which can be used as diluent material include propane, isobutane, n-pentane, isooctane, n-dodecane, cyclopentane, cyclohexane, methylcyclopentane, ethylcyclopentane, dimethylcyclopentane, ethylcyclohexane, benzene, toluene, xylene, ethylbenzene, naphthalene, and the like. The polymerization can also be carried out in the presence of mixtures of the aforesaid hydrocarbon solvents and with admixtures of polar compounds which do not inactivate the organoalkali-metal catalyst. Amounts of the polar compounds, such as between 0.005 to 50 weight percent of the total solvent mixture, can be employed to promote the formation of random copolymers. Polar materials such as ethers, thioethers and tertiary amines can be suitably employed. Exemplary are dimethyl ether, diethyl ether, ethylmethyl ether, ethylpropyl ether, di-n-propyl ether, di-n-octyl ether, dibenzyl ether, diphenyl ether, anisole, tetramethylene oxide, 1,2-dimethyloxyethane, 1,3-dioxanedimethyl sulfide, paraldehyde, diethyl sulfide, di-n-propyl sulfide, di-n-butyl sulfide, methylethyl sulfide, dimethylethylamine, tri-n-propylamine, tri-n-butylamine, trimethylamine, triethylamine, N,N-dimethylaniline, pyridine, quinoline, N-ethyl piperidine, N-methyl-N-ethyl aniline, N-methyl morpholine, and the like.

The use of polar solvents as randomizing agents is fully disclosed in U.S. Pat. 2,975,160 issued to Zelinski Mar. 14, 1961, and is herein incorporated by reference thereto.

Randomizing agents such as potassium alkoxides or hexamethylphosphoramide can also be employed.

At the completion of the polymerization reaction and subsequent to the treatment with the allyl compound according to this invention the reaction mixture can be treated according to conventional methods to inactivate the catalysts or to recover the polymer product. Any suitable treating method can be used and one method for accomplishing the desired treatment comprises adding to the reaction mixture a catalyst-inactivating material such as water, alcohol, e.g., ethyl alcohol or isopropyl alcohol, an organic or inorganic acid or the like. Various compounds suitable as antioxidants, such as substituted phenols, can be added to the polymer solution prior to the precipitation of the polymer. The precipitated polymer can be recovered by filtration, decantation, or the like, when subjected to further purification separation processes.

According to this invention any conventional organo-alkali-metal initiator that can polymerize the monomeric materials hereinbefore described can be employed. Organoalkali-metal initiators represented by the formula $R(M)_x$, wherein M is an alkali metal, R is a hydrocarbon radical selected from the group consisting of aliphatic, cycloaliphatic, and aromatic radicals containing from about 1 to 20 carbon atoms, and $x$ is an integer from 1 to 4, are known to be excellent organoalkali-metal polymerization initiators that can be preferably employed. Hydrocarbyllithium polymerization initiators are preferred. Exemplary of the aforegoing initiators are methyllithium; isopropyllithium; n-butyllithium; tertiary-octyllithium; sec-butyllithium; phenyllithium; naphthyllithium; 4-butylphenyllithium; 1,4-dilithiobutane; 1,5-dilithionaphthalene; 1,5,10,20 - tetralithioeicosane; 1,2,4,6 - tetralithiocyclohexane; 4 - butylphenylsodium; 4 - phenylbutylcesium; 4-cyclohexylbutylpotassium; and the like. The amount of initiator employed is generally in the range to provide from about 0.1 to 100, preferably 0.5 to 10, milliequivalents of alkali metal per 100 grams of monomers.

As herein stated any alkali-metal based initiators suitable for the polymerization of the hereinbefore described monomeric materials can be employed according to this invention.

Multifunctional polymerization initiators such as prepared from the reaction between organomonolithium compounds with polyvinyl phosphine compounds or polyvinyl silane compounds such as disclosed in U.S. patent application Ser. No. 795,364, filed Jan. 30, 1969, by Ralph C. Farrar can be suitably employed. Other novel multifunctional initiators such as disclosed in U.S. patent application Ser. No. 795,365, by Floyd E. Naylor filed Jan. 30, 1969 and U.S. patent application Ser. No. 793,910 filed Jan. 24, 1969, by Ralph C. Farrar are also exemplary.

The allyl compounds that can be employed according to this invention can be represented by the formula $R'_nN(CH_2CH=CH_2)_m$, wherein R' is a hydrocarbon radical selected from the group consisting of aliphatic, cycloaliphatic, and aromatic radicals containing from 1 to 20 carbon atoms, and $m$ is 1, 2 or 3 and $n$ is the valence of N minus $m$.

Allyl compounds that can be employed according to this invention can be represented by the following examples: triallylamine, eicosyldiallylamine, diethylallylamine, cyclohexyldiallylamine, diphenylallylamine; and the like.

Illustrative of the foregoing discussion and not to be interpreted as a limitation on the scope thereof or on the ingredients therein employed the following examples are presented.

EXAMPLE I

Polybutadiene was prepared according to the following polymerization recipe:

Polymerization recipe

| | Parts, by wt. |
|---|---|
| 1,3-butadiene | 100 |
| Cyclohexane | 790 |
| n-Butyllithium (n-BuLi), mhm.[1] | 1.5 |
| Triallylamine (TAA) | Variable |
| Temperature, °C. | 70 |
| Time, hours | 3 |

[1] Mhm.=Gram millimoles per 100 grams of monomer.

In these runs cyclohexane was charged to the reactor followed by a nitrogen purge after which butadiene was added. n-Butyllithium was added next followed by the triallylamine in Run 1. Temperature was adjusted to the indicated level and each mixture was agitated throughout the polymerization. At the end of the polymerization reaction a 10 weight percent solution of 2,2'-methylene-bis(4-methyl - 6 - tert-butylphenol) antioxidant in a 50/50 percent by volume isopropyl alcohol/toluene was added with the amount being sufficient to provide about 1 part by weight of the antioxidant per 100 parts of the polymer. Each mixture was coagulated by stirring with isopropyl alcohol and the polymer separated and dried. The results are reported in Table I and demonstrate that the triallylamine addition provides a broadening of the molecular weight distribution (higher H.I.) while the microstructure is essentially unchanged. Use of the allyl compound of this invention thus provides a polymer of improved processing characteristics accompanied with good physical properties.

TABLE I

| Run No. | (TAA) mhm. | Conversion, percent | Inherent viscosity [a] | Unsaturation | | H.I.[c] |
|---|---|---|---|---|---|---|
| | | | | Trans. percent | Vinyl. percent [b] | |
| 1 | 0.5 | 100 | 1.31 | 49.3 | 8.5 | 1.48 |
| 2 | | 100 | 1.30 | 48.6 | 9.0 | 1.15 |

[a] Determined according to procedures of U.S. 3,278,508; col. 20, notes (a) and (b). Polymers were gel-free.
[b] Determined according to procedure of U.S. 3,278,508; col. 20, lines 71 ff and col. 21, lines 1-21.
[c] H.I.=Heterogeneity Index, the ratio of weight average molecular weight (Mw) to the number average molecular weight (Mn) as determined by gel permeation chromotagraphy.

EXAMPLE II

A copolymer of butadiene and styrene was prepared according to the following polymerization recipe:

| | Parts by wt. |
|---|---|
| 1,3-butadiene | 75 |
| Styrene | 25 |
| Cyclohexane | 790 |
| Tetrahydrofuran (THF) | 1.5 |
| n-Butyllithium (n-BuLi) | Variable |
| Triallylamine (TAA) | Variable |
| Temperature, °C. | 70 |
| Time, hours | 3 |

In these runs cyclohexane was charged to the reactor first followed by a nitrogen purge. Butadiene and styrene were added next to form a monomer mixture, then tetrahydrofuran followed by the n-butyllithium. Triallylamine, if employed, was added next or as indicated in Runs 2 and 5. The temperature was adjusted to the indicated level and each mixture was agitated throughout the reaction period. Polymers were recovered from each run in the same fashion as reported in Example I.

The results reported in Table II demonstrate that according to this invention the addition of a triallylamine produces a broadening of the molecular weight distribution, a reduction in the cold flow, and an increase in the Mooney viscosity of the polymer. It is therein demonstrated that the triallylamine can be added initially, during the polymerization, or after the polymerization is complete but prior to shortstopping the reaction mixture.

TABLE II

| Run No.[a] | (TAA) mhm. | (n-BuLi) mhm. | ML–4[d] at 212° F. | Cold flow,[e] mg./min. | H.I.[f] | Inherent viscosity[f] |
|---|---|---|---|---|---|---|
| 1 | 0.5 | 1.5 | 20 | | 1.65 | 1.37 |
| 2 | [b] 0.5 | 1.5 | 12 | | 1.43 | 1.33 |
| 3 | | 1.5 | 11 | | 1.25 | 1.13 |
| 4 | 0.4 | 1.25 | 15.5 | 6.7 | 1.56 | 1.29 |
| 5 | [c] 0.4 | 1.25 | 11.5 | 8.0 | 1.52 | 1.16 |
| 6 | | 1.25 | 7 | 21.0 | 1.25 | 1.01 |

[a] Conversion in each run was 100 percent.
[b] TAA added after 2.5 hours reaction.
[c] TAA added after 2.2 hours reaction.
[d] ASTM D 1646–63.
[e] Cold flow is measured by extruding the polymer through a ¼-inch orifice at 3.5 p.s.i. pressure at 50° C. After allowing 10 minutes to reach steady state, the rate of extrusion is measured and reported in milligrams per minute.
[f] As reported in Table I footnotes.

EXAMPLE III

Additional runs were made polymerizing 1,3-butadiene with n-butyllithium initiator employing triallylamine according to the instant invention. The polymerization recipe was the same as that employed in Example I and the results from these runs are reported in Table III.

These results again demonstrate that the addition of the allyl compound initially, during, or after polymerization is essentially complete, produces a broadening in the molecular weight distribution, increase in the inherent viscosity and Mooney viscosity, and a decrease in cold flow in the conjugated diene polymers made according to this invention. All of these caracteristics are demonstrative of polymers with improved processing characteristics.

TABLE III

| Run No.[b] | (TAA) mhm. | ML–4[c] at 212° F. | Cold flow,[c] mg./min. | H.I.[c] | Inherent viscosity[c] |
|---|---|---|---|---|---|
| 1 | 0.30 | 28.5 | 24.8 | 1.29 | 2.11 |
| 2 | 0.35 | 23.5 | 18.1 | 1.24 | 1.97 |
| 3 | [a] 0.35 | 22 | 24.3 | 1.20 | 1.93 |
| 4 | | 18 | 37.1 | 1.19 | 1.84 |

[a] TAA added after 2.2 hours reaction.
[b] Conversion in each run was 100 percent.
[c] As reported in Table II footnotes.

EXAMPLE IV

Additional runs were made employing triallylamine in the copolymerization of 1,3-butadiene and styrene using n-butyllithium as the initiator. The charging procedure and polymer recovery steps were the same as employed in Example II. The polymerization recipe was the same as employed in Example II except that 2 hours polymerization time was provided. The results are reported in Table IV and demonstrate that random copolymers of 1,3-butadiene and styrene made according to this invention have reduced cold flow and increased Mooney viscosity values.

TABLE IV

| Run No.[a] | (n-BuLi) mhm. | (TAA) mhm. | ML–4[b] at 212° F. | Cold flow[b] mg./min. | H.I.[b] | Inherent viscosity[b] |
|---|---|---|---|---|---|---|
| 1 | 1.2 | 0.40 | 49 | 0.83 | 1.59 | 1.66 |
| 2 | 1.3 | 0.43 | 33 | 2.5 | Not determined | |
| 3 | 1.4 | 0.47 | 27 | 5.0 | 1.78 | 1.38 |
| 4 | 1.2 | | 25 | 8.0 | Not determined | |
| 5 | 1.3 | | 26 | 8.4 | 1.27 | 1.42 |

[a] Conversion in each run was 100 percent.
[b] As reported in Table II footnotes.

EXAMPLE V

Additional runs were made in which 1,3-butadiene and styrene were copolymerized by using a multifunctional lithium initiator formed as the reaction product of sec-butyllithium with triallylamine. Triallylamine was also employed according to this invention to improve the processing properties of the polymer thus prepared. The polymerization recipe, charging procedure, and polymer recovery method were the same as those employed in Example IV. The results of the runs are reported in Table V and demonstrate that by an addition of the allyl compound of this invention a decrease in cold flow and a polymer with improved processing properties is obtained.

TABLE V

| Run No.[a] | Initiator[b] mhm.[c] | TAA | ML–4 at 212° F.[d] | I.V.[d] | Cold flow mg./min.[d] |
|---|---|---|---|---|---|
| 1 | 5.5 | | 33 | 1.52 | 2.9 |
| 2 | 5.5 | 37 | 36 | 1.53 | 1.1 |

[a] Conversion in each run was 100 percent.
[b] Initiator prepared by reacting 40 ml. of 1.5 M sec-butyllithium in cyclohexane with 2.8 g. (20 millimoles) of triallylamine for 20 minutes at 70° C.
[c] Based on sec-butyllithium.
[d] As reported in Table II footnotes.

EXAMPLE VI

Butadiene/styrene random copolymers were prepared according to this invention and according to the following polymerization recipe:

Polymerization recipe

| | Parts by wt. |
|---|---|
| 1,3-butadiene | 75 |
| Styrene | 25 |
| Cyclohexane | 790 |
| Initiator | Variable |
| Triallylamine (TAA) | Variable |
| Tetrahydrofuran | 1.5 |
| Temperature, ° C. | 70 |
| Time, hours | Variable |

The polymerization results are shown in Table VI. The compounding recipe, processing properties, and physical properties of the polymers produced in this example were evaluated as shown by the results in Table VII. The results shown in Tables VI and VII demonstrate that butadiene/styrene copolymers prepared according to this invention show improvements in processing properties and physical properties when compared to control polymers prepared without the use of allyl compounds of this invention.

TABLE VI

| Run No.[a] | Initiator (mhm.) | (TAA) mhm. | Time, hours | ML–4[b] at 212° F. | Cold flow,[b] mg./min. | Inherent viscosity[b] |
|---|---|---|---|---|---|---|
| 1 | n-BuLi (1.1) | | 2.5 | 47 | 0.57 | 1.67 |
| 2 | n-BuLi (1.3) | 0.4 | 2 | 46.5 | 0.0 | 1.68 |

[a] Conversion in each run was 100 percent.
[b] As reported in Table II footnotes.

TABLE VII

Compounding recipe

| | Parts, by wt. |
|---|---|
| Polymer | 100 |
| IRB No. 2 [1] | 50 |
| Zinc oxide | 3 |
| Stearic acid | 2 |
| Flexamine [2] | 1 |
| Philrich 5 [3] | 10 |
| Sulfur | 1.75 |
| Santocure [4] | 1.2 |

[1] Industry Reference Black No. 2, a high abrasion furnace black.
[2] Highly aromatic oil. Type 101 (ASTM D 2226–63T).
[3] A mixture containing 65 percent of a complex diarylamine-ketone reaction product and 35 percent of N,N'-diphenyl-p-phenylenediamine.
[4] N-cyclohexyl-2-benzothiazolesulfenamide.

PROCESSING PROPERTIES

| Polymer of Run No. | Compound ML-4 at 212° F. | Extrusion at 250° F. | | | | |
|---|---|---|---|---|---|---|
| | | In./min. | G./min. | Appearance a | Feed rating b | Dispersion |
| 1 (control) | 68 | 43 | 70 | 11 | 2 | Poor. |
| 2 | 75 | 67 | 112 | 8 | 5 | Good. | a Range 3-12, 12 best.
b Range 0-10, 10 best.

PHYSICAL PROPERTIES

| Polymer of Run No. | Comp.a set, percent | 300% modulus,b p.s.i. | Tensile,b p.s.i. | Elongation, percent | Tear at 200° F.,c lb./in. | $\Delta T$,d ° F. | Resilience,e percent | Hardness,e Shore A |
|---|---|---|---|---|---|---|---|---|
| | | | | 30 min. cure at 307° F. | | | | |
| 1 (control) | 8.7 | 1,560 | 3,380 | 510 | 110 | 56 | 68 | 61 |
| 2 | 8.6 | 1,470 | 3,530 | 540 | 120 | 59 | 67 | 61 |
| | | | | Oven aged 24 hours at 212° F. | | | | |
| 1 (control) | | 2,200 | 2,800 | 360 | | 52 | 72 | 64 |
| 2 | | 2,080 | 2,770 | 370 | | 54 | 72 | 65 | a ASTM D 1646-61.
b ASTM D 1646-62T.
c ASTM D 624-54 Die A-Crescent.
d ASTM D 1646-62.
e ASTM D 1646-59.
f ASTM D 1706-61.

As will be evident to those skilled in the art, various modifications of this invention can be made or followed, in light of the disclosure and discussion herein set forth without departing from the scope or the spirit thereof.

I claim:
1. In a process for preparing conjugated diene polymers with an organoalkali-metal polymerization initiator, the improvement comprising adding to the polymerization reaction mixture, prior to deactivation of said organoalkali-metal initiator, an allyl amine represented by

$$R'_nN(CH_2CH=CH_2)_m$$

wherein R' is a hydrocarbon radical containing from about 1 to 20 carbon atoms and is selected from aliphatic, cycloaliphatic, or aromatic radicals, m is 1, 2 or 3; and N is the valence of n minus m; wherein said allyl amine is added in an amount to provide from about 0.1 to 5 millimoles of said allyl amine per 100 grams of monomers employed in preparing said conjugated diene polymers, and wherein said conjugated diene polymers are conjugated diene homopolymers of copolymers of different conjugated dienes with each other, or copolymers of conjugated dienes with monovinyl substituted aromatic hydrocarbons.

2. The process of claim 1 wherein said allyl amine is added at the commencement of the polymerization reaction in an amount to provide from about 0.25 to 1 millimole of said allyl compound per 100 grams of monomer.

3. The process of claim 1 wherein said allyl amine is added during the polymerization reaction in an amount to provide from about 0.25 to 1 millimole of said allyl amine per 100 grams of monomer.

4. The process of claim 1 wherein said allyl amine is added to the polymerization reaction after the polymerization has essentially completed, wherein from about 0.25 to 1 millimole of said allyl amine per 100 grams of monomer are provided, and wherein from about 0.1 to 6 hours are allowed to elapse after said allyl amine is added and before said deactivation of said organoalkali-metal initiator.

5. The process of claim 4 wherein from about 0.5 to 2 hours are allowed to elapse after said allyl amine is added and before said deactivation of said organoalkali-metal initiator and wherein said conjugated diene polymer is a homopolymer of butadiene or a copolymer of butadiene/styrene.

6. The process of claim 1 wherein said allyl amine is triallylamine, said organoalkali-metal initiator is n-butyllithium, and said conjugated diene polymer is a homopolymer of butadiene or a butadiene/styrene copolymer.

7. The process according to claim 1 wherein said organoalkali-metal initiator is a hydrocarbyllithium compound, wherein the polymerization reaction is conducted at a temperature within the ranges of about −30 to 150° C. in the presence of a hydrocarbon diluent at a pressure sufficient to maintain the monomeric materials essentially in the liquid phase.

8. The polymeric product produced according to the process of claim 1.

References Cited
UNITED STATES PATENTS

| 2,008,491 | 7/1935 | Ebert et al. | 260—94.2 |
| 3,280,084 | 10/1966 | Zelinski et al. | 260—83.7 |
| 3,301,840 | 1/1967 | Zelinski | 260—94.2 |
| 3,402,162 | 9/1968 | Strobel | 260—94.7 |
| 3,536,691 | 10/1970 | Trepka et al. | 260—94.2 |

JAMES A. SEIDLECK, Primary Examiner

U.S. Cl. X.R.

260—85.1, 94.6, 94.7 N

UNITED STATES PATENT OFFICE

CERTIFICATE OF CORRECTION

Patent No. 3,658,776     Floyd E. Naylor     Dated: April 25, 1972

It is certified that error appears in the above-identified patent and that said Letters Patent are hereby corrected as shown below:

Claim 1, Column 7, line 40, at the end of the line, "N" should be --- n ---.

Claim 1, Column 7, line 41, after "of" and before "minus",

"n" should be --- N ---.

Signed and sealed this 17th day of October 1972.

(SEAL)
Attest:

EDWARD M. FLETCHER, JR.            ROBERT GOTTSCHALK
Attesting Officer                       Commissioner of Patents